United States Patent [19]

Crean

[11] Patent Number: 4,525,721

[45] Date of Patent: Jun. 25, 1985

[54] INK JET INTERLACE STRATEGY

[75] Inventor: Peter A. Crean, Penfield, N.Y.

[73] Assignee: Xerox Corporation, Stamford, Conn.

[21] Appl. No.: 471,411

[22] Filed: Mar. 2, 1983

[51] Int. Cl.[3] .............................................. G01D 15/18

[52] U.S. Cl. .......................................... 346/1.1; 346/75

[58] Field of Search .................................... 346/1.1, 75

[56] References Cited

U.S. PATENT DOCUMENTS

| | | | |
|---|---|---|---|
| 3,596,275 | 7/1971 | Sweet | 346/1 |
| 3,786,517 | 1/1974 | Krause | 346/75 |
| 4,034,379 | 7/1977 | Berry | 346/75 X |
| 4,054,882 | 10/1977 | Ruscitto | 346/75 X |
| 4,255,754 | 3/1981 | Crean et al. | 346/1 |
| 4,364,058 | 12/1982 | Tamai et al. | 346/75 |
| 4,425,518 | 1/1984 | Suzuki et al. | 346/75 |

OTHER PUBLICATIONS

Co-Pending U.S. Ser. No. 296,922 filed Apr. 27, 1981 to A. Lipani et al., entitled "Bipolar Ink Jet Method and Apparatus".

*Primary Examiner*—George H. Miller, Jr.
*Attorney, Agent, or Firm*—Robert A. Chittum

[57] ABSTRACT

An improved ink jet recording interlace strategy. Sequentially generated ink droplets directed to a recording medium are first charged and deflected by a uniform electric field. The charge sequence on the droplets is such that the droplets are separated by the electric field as they travel toward the medium thereby reducing electrostatic and aerodynamic interactions between droplets. The separation of droplets conforms to an interlace scheme wherein droplets directed to closely adjacent recording medium locations are separated by a number of droplets whose placement of said medium conforms to a multi-level interlace such that the scan direction of the number of droplets is disrupted at least once. In this way, sequentially generated droplets are directed to non-sequentially pixel locations in non-sequential interlace portions of the total number of adjacent pixel locations assigned to a particular nozzle.

4 Claims, 7 Drawing Figures

NON-INTERLACED DROPLETS

INTERLACED DROPLETS

ALTERNATE INTERLACE DROPLET SCHEME 3-2 INTERLACE SCHEME 2-3 INTERLACE SCHEME

INK JET INTERLACE STRATEGY

BACKGROUND

1. Field of the Invention

The present invention relates to ink jet printing and more particularly, to an improved droplet interlace procedure for enhancing drop placement accuracy in such printing.

2. Prior Art

Ink jet printers wherein ink droplets impinge on a recording medium moving past the printer are known. A typical ink jet printer comprises a droplet generator which selectively and in a controlled manner causes ink droplets to strike a recording medium such as paper, thereby providing a permanent record of the information. Ink jet printers can comprise a single nozzle through which the droplets are directed to a relatively moving recording member or alternatively, a number of nozzles can simultaneously direct ink droplets to the medium. Ink jet printers are used in word processing as well as graphic display applications and have perceived speed capabilities in excess of conventional impact type printers.

A number of ink jet printing architectures have evolved. One type of ink jet printer uses the so-called drop-on-demand printing technique. In a drop-on-demand system, droplets are generated for only those incremental areas on the medium where information is to be encoded. Each droplet follows a straight path to the paper. No complex droplet charging or guttering mechanism is required, since all drops which are emitted from the droplet generator strike the paper.

One perceived constraint on the drop-on-demand configuration is an upper boundary to the speed of information throughput such a system can handle. If, for example, the ink jet system is to be employed in a letter quality printer, it is presently believed a copy rate of about one page every 30 seconds is possible with the drop-on-demand system. While this speed may be adequate for a typewriter, it is not adequate for high speed duplicating or copying. For those ink jet applications requiring high speed operation, a second type of architecture utilizing continuous drop production is preferred.

U.S. Pat. No. 3,596,275 to Sweet discloses a recording system wherein a sequence of ink drops are directed to a recording medium in a controlled manner in order to encode that medium with information. A typical Sweet type ink printer has one or more ink jet nozzles through which ink under pressure is directed toward a record medium such as paper. As ink is forced through the one or more nozzles, an external source of energy provides a perturbation to the ink to induce droplets to break off at controlled intervals a well-defined distance from the ink droplet generator. At the point of droplet break off, these droplets may be immediately charged by induction so that the droplet trajectory may be altered or modified by a uniform electric field downstream from the droplet formation point.

Certain subclasses exist in the continuous type ink jet printing architecture. In a so-called binary arrangement, the ink droplets either travel in a path to a guttering system where the ink is recirculated back to the ink jet generator or in the alternative, travel along a path to the record medium. The alternate droplet trajectories are achieved by selectively charging the ink droplets by a technique known in the art. As in the drop-on-demand architecture, this type of ink jet printing can be performed with either single or multiple ink jet nozzles.

A second type of continuous droplet formation system employs a transverse scanning architecture wherein once droplets have been charged to an appropriate value, passage through a uniform electric field interposed between the generator and the record medium causes the ink droplet to scan from side-to-side in the direction transverse to paper motion. In this so-called "stitched" arrangement, a given ink jet nozzle supplies ink droplets to a number of incremental areas (pixels) on the paper. The term "stitched" derives from the fact that ink droplets from adjacent nozzles must be carefully positioned on the recording medium so that they stitch together to completely cover the width of the paper. It should be appreciated that for both a stitched type and binary type continuous droplet arrangement, relative longitudinal movement between the generator and the paper is provided as ink droplets fly towards the paper.

An example of a side-to-side scanning ink jet arrangement is disclosed in co-pending U.S. patent application entitled "Bipolar Ink Jet Method and Apparatus", Ser. No. 296,922, filed Apr. 27, 1981 to A. Lipani et al which is incorporated herein by reference. The apparatus constructed in conformity with the invention disclosed in that application includes an ink jet marking array having a number of ink jet column generators for directing a series of ink droplets in the direction of a recording medium. A series of spaced electrodes are utilized for creating regions of substantially uniform electric field strength through which the ink droplets travel in their trajectory towards the recording medium. Prior to entering the region of electric field generated by the plurality of electrodes, a charging mechanism induces charge on the droplets thereby causing those droplets to experience a desired deflection as they pass through the electric field generated by the electrodes.

The architecture disclosed in the aforementioned patent application utilizes a bipolar scanning technique as a preferred embodiment, but, of course, would be also applicable in an ink jet device utilizing an induced charge of a single polarity for the droplets. In the preferred bipolar arrangement, droplets are either positively or negatively charged depending upon the direction of intended deflection once they enter the electric field. As documented in the foregoing patent appliction, this bipolar arrangement provides one strategy in that it helps limit the time of flight of the droplets in their travel to the recording medium.

A second strategy disclosed in the aforementioned application is the utilization of an interlace charging strategy which specially separates charged ink droplets thereby reducing interactions between droplets as they travel to their intended positions on the recording medium. The aim of the interlace strategy is to spacially separate sequentially generated ink droplets which otherwise would adversely interact with each other due to their close proximity in space. More particularly, as noted in the Lipani et al application, aerodynamic and electrostatic interactions between closely positioned successive ink droplets can misposition those droplets in flight and result in drop placement errors.

The theory of an interlace charging scheme is to spread out the position of the charged droplets in their flight path to the recording medium so that each droplet experiences a uniform aerodynamic breaking effect and also to reduce the coulomb attractions and repulsions between closely adjacent droplets. It should be recalled that in a stitched, continuous droplet-production system, each nozzle generates a number of ink droplets which sequentially scan across the width of a portion of the paper as the image or information is recorded on the receiving member. The interlace strategy disrupts or interrupts the sequential scanning of ink droplets so that successive droplets strike non-successive picture elements (pixels) on a given recording member portion. Thus, in scanning across a portion of the receiving member, adjacent picture elements will be printed by non-successive ink droplets. The advantages of such a system are documented in the Lipani et al application and will be reviewed in the present discussion of a preferred embodiment of the invention.

In a typical interlace or non-sequential printing pattern, as the interlace level is increased, the axial or drop-to-drop separation along the direction of droplet movement increases as the transverse or side-to-side droplet separation is reduced. If, for example, a quadrupole interlace scheme is envisioned (i.e. the number of adjacent linear pixel locations on the recording medium allotted to the droplets of one of a plurality of nozzles is divided into four portions), the axial separation between droplets is on the order of 4 droplet spacings where the droplet spacing equals the droplet velocity divided by the frequency of droplet production. In a prior art quadrupole interlace scheme, however, sequentially generated droplets are transversely separated in the direction of droplet deflection no more than one-quarter the width of the channel through which a particular nozzle sends droplets.

In a non-interlace scheme shown in FIG. 2A, the first droplet is directed to the first pixel location, the second droplet is directed to the second location, and the third droplet is directed to the third pixel location, etc. As can be seen in FIG. 2A, the axial spacing (y) is the distance between adjacently generated droplets; for example, the distance between the first and second droplets. The maximum transverse spacing (x) is the distance between adjacent pixel locations.

A triple interlace scheme is depicted in FIG. 2B wherein a lineal number of adjacent pixel locations alloted to one nozzles is 42 and this number of pixel locations is divided into three segments of fourteen pixels each. With this prior art scheme, sequentially generated droplets are serially placed one each in the fourteen pixel segments. The first droplet is directed to pixel location number 1, the next generated droplet is directed to pixel location number 15 which is the first pixel location in the second segment, the third generated droplet is directed to pixel location number 29 which is the first pixel location in the third segment, the fourth generated droplet is directed to the pixel location 2 which is the second pixel location in the first segment, etc. As can be seen, one droplet, sequentially generated, goes to each segment in ascending order of pixel locations before repeating the sequence for the pixel locations adjacent the ones first addressed. The targeted pixel location for the droplet, numbered in order that they are generated, are placed in parenthesis beside the droplet number. As the order or number of interlace is increased to accommodate a desire for greater axial separation, the side-to-side separation for sequentially generated droplets decreases.

It is one aim of the present invention to allow increased axial separation between droplets while maintaining the side-to-side or transverse separation to avoid droplet misplacement caused by coulomb interaction between droplets.

SUMMARY OF THE INVENTION

The present invention relates to an interlace strategy which increases drop-to-drop or axial spacing between droplets following approximately the same trajectory to adjacent pixel locations on the recording medium, while also spacially separating successively generated droplets to reduce coulomb attractions or repulsions between those droplets. This strategy, discussed in detail below, aids in achieving drop placement accuracy and is the result of a multi-level interlace of the droplets.

According to the invention, one or more ink jet nozzles direct a plurality of ink jet columns toward a record medium along a path or paths passing through a uniform electric field. The one or more columns are perturbed so that they break up into individual droplets prior to passing through the electric fields. As the droplets break off from the columns, specific charges are induced on those droplets according to the scheme which causes sequentially generated droplets to be deflected by the electric field to pixel locations in non-sequential segments of pixel locations on the recording medium that are allotted to the droplets generated by one nozzle. The present interlace strategy uses, for example, a multiple level, six interlace scheme for 42 lineal pixels locations such that droplets directed to adjacent pixel locations on the medium are separated by a number of other droplets interlaced with each other in a manner to optimize transverse spacing between sequentially generated droplets while maintaining optimum axial spacing, thus maximizing both axial and transverse spacing between droplets and achieving reduced coulomb and aerodynamic interactions between droplets.

The invention is most easily understood when contrasted with a prior art interlace scheme wherein successively generated droplets are scanned sequentially across the direction of droplet deflection. According to the present scheme, the rhythm of interlace is interrupted as successive droplets in the interlace scheme are directed to the paper. By rhythm, it is meant that the sequentially generated droplets are not directed to sequential segments of pixel locations allotted to a particular nozzle. As will be seen in conjunction with a detailed description of a preferred embodiment of the invention, practice of this multiple level or interrupt, six interlace pattern maintains axial or drop-to-drop spacing between droplets traveling along similar trajectories but increases the transverse or side-to-side displacement between successively generated droplets over the prior art single level, six interlace strategy. The number of segments or orders of interlace that comprise the total number of lineal pixel locations per nozzle is, of course, a design choice, as is the total number of pixels per nozzle.

The preferred interlace strategy has particular applicability to a high speed ink jet printer. In such a printer, it is necessary that the drop-to-drop spacing along the direction of droplet movement be increased to reduce aerodynamic droplet interaction. Practice of the present invention allows increased drop-to-drop spacings for droplets traveling along approximately the same trajectory while avoiding the reduced effectiveness accompanying prior art strategies due to reduced transverse spacing between successively generated droplets.

One object of the present invention is to improve droplet placement accuracies in a continuous drop production system through utilization of a new and improved droplet interlace strategy or approach. Other objects, features, and advantages of the present invention will be more completely understood through review of the detailed description of the preferred embodiment of the invention described in conjunction with the accompanying figures.

BRIEF DESCRIPTION OF THE DRAWINGS

Referring now to the drawings and in particular FIG. 1, there is depicted a schematic representation of a Sweet type ink jet printer 110 comprising an ink jet generator 112 having a manifold for generating a one or more jet columns 114. Since FIG. 1 is a side view, only one column is seen in that figure but it should be appreciated that a series of nozzles could extend along the manifold to generate a series of parallel ink columns. The generator 112 is coupled to an ink reservoir 116 from which ink is pumped by a pump 118 to the generator 112. The pump 118 maintains ink inside the generator 112 at a pressure sufficient to cause ink to be squirted through one or more orifices in the manifold toward a recording member 120 moving in relation to the ink jet generator 112. Also coupled to the generator 112 is a source of excitation 122 which causes the columns 114 to break up into ink droplets 124 at a well-defined distance from the generator 112. As the columns 114 are breaking up into individual droplets 124, a charging electrode 126 induces a net electric charge on each droplets in accordance with a scheme related to a desired subsequent droplet trajectory.

Figure 1:
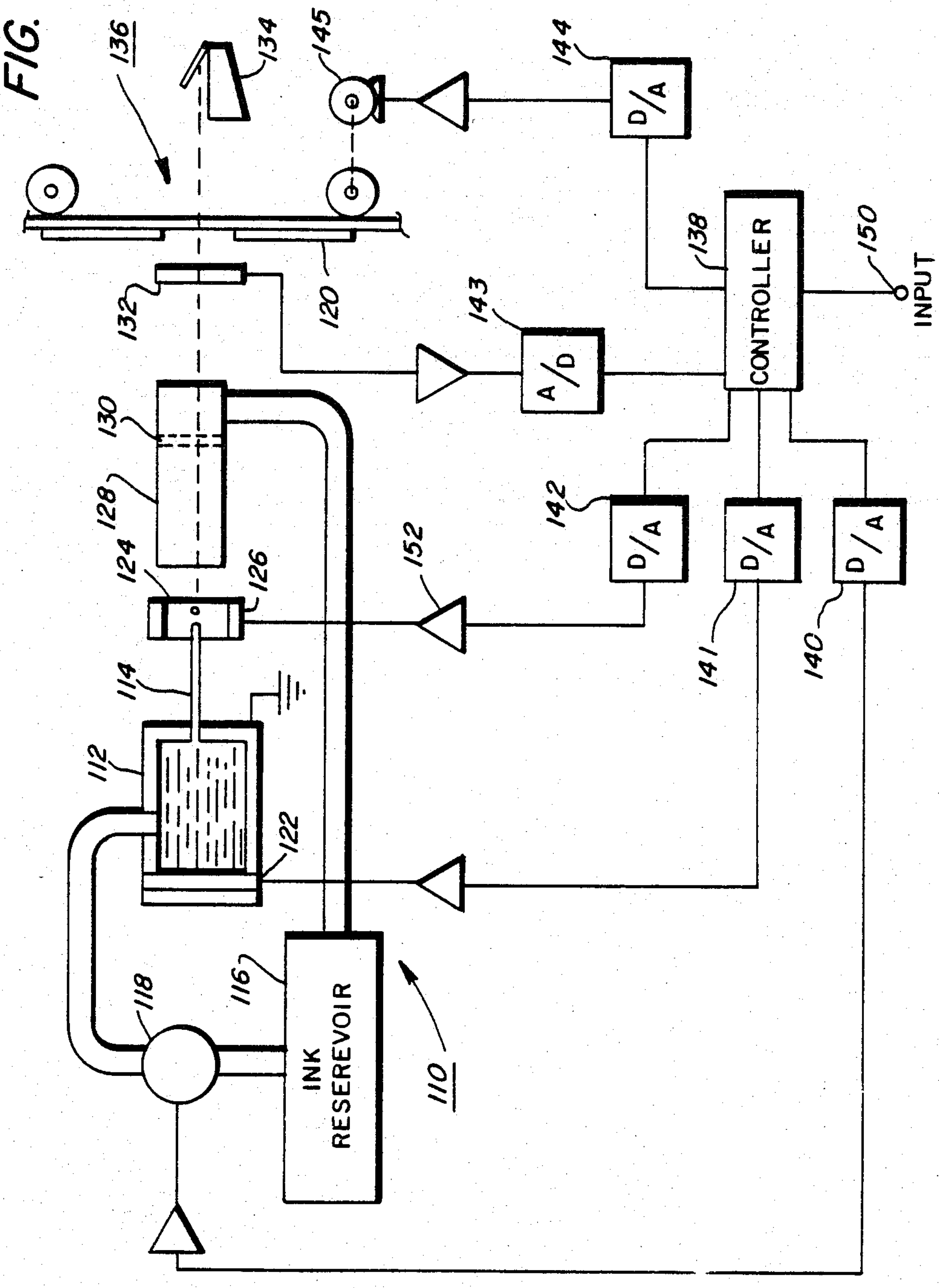
FIG. 1 is a schematic elevational view of an ink jet printer constructed according to a continuous droplet generation design.

Downstream from the charging electrode 126 are located a number of field creating electrodes 128 which are energized to voltages which create an electric field through which the charged droplets 124 must pass. As is well known, a charged particle passing through an electric field will experience a force related to both the magnitude and polarity of the charge on the particle and the electric field strength through which it is passing. An uncharged droplet, therefore, will pass unimpeded through the electrodes 128 toward the recording member 120. A charged particle will be diverted in its initial trajectory depending upon its charge magnitude and polarity. By transmitting appropriate charging potentials to the charging electrode 126 as each droplet is formed at the electrode, it is possible to selectively bend or redirect those droplets to a desired portion of the recording medium. Certain droplets, charged or uncharged as the case may be, are directed to a gutter 130 for recirculation to the ink reservoir.

Droplets which are either uncharged or charged to a level insufficient to cause their trajectory to lead to the gutter 130, are directed past a droplet sensor 132 to the recording medium 120. The drop sensor 132 is used to sense passage of ink droplets toward the recording media and modify printer operation to insure that ink droplets from the plurality of columns are properly positioned on the recording medium, whether a stitched or unstitched system is used. When a stitched system is utilized, the drop sensor 132 insures that the ink droplets are properly stitched together to allow each incremental region on the recording medium to be accessed by droplets from one of the manifold nozzles. An example of the use and application of a typical drop sensor 132 is disclosed in U.S. Pat. No. 4,255,754 to Crean entitled "Fiber Optic Sensing Method & Apparatus for Ink Jet Recorders" which has been assigned to the assignee of the present invention. The Crean patent is herein expressly incorporated by reference.

A second gutter 134 for recirculating ink droplets is used to intercept droplets generated while calibrating the system with the aid of the drop sensor 132. One application to which the present invention has particular applicability is a high speed ink jet device wherein successive sheets of paper 120 are transmitted past the ink jet printhead and encoded with information. Experience has indicated that it is desirable to recalibrate the printer at periodic intervals to insure that the droplets 124 are directed to desired regions on the recording member 120. To accomplish this calibration, ink droplets are generated and caused to travel past the sensors 132 when no recording member 120 is in position to receive those droplets. In the calibrate mode of operation, it is therefore necessary that a gutter 134 be positioned to intercept droplets which would otherwise strike the recording member.

A transport mechanism 136 is also shown in FIG. 1. The transport 136 is used to move individual sheets of paper 120 or the like past the printer 110 at a controlled rate of speed. Since the present printer is a high speed device, a mechanism must be included in the transport 136 for delivering unmarked paper to the transport and for stripping marked paper away from the transport once it has been encoded by the printer 110. These features of the transport 136 have not been illustrated in FIG. 1.

Ink droplet generation, charging, and recording medium transport are all controlled by a central processor or controller 138 which interfaces to the various components of the printer 110 by digital to analog and analog to digital converters 140–144. The controller comprises an input 150 for receiving a sequence of digital signals representative of desired voltages to be applied to the charging electrodes 126. The controller then generates multi-bit digital signals representative of the desired charging voltages. A first digital to analog converter 142 converts the digital signals representative of the desired charging voltage to an analog signal which is coupled to a power amplifier 152 which in turn energizes the charging electrode 126.

In addition to generating a charging voltage for the plurality of charging electrodes 126, the controller 138 receives inputs from the sensor 132 via an analog to digital converter 143, controls the speed of movement of the recording medium 120 via a second digital to analog converter 144 which drives a motor 145, controls perturbation in the ink jet generator 112 by the source of excitation 122 through a third digital to analog converter 141, and controls the pressure maintained inside the generator by the pump 118 with a fourth digital to analog converter 140. Although critical to the operation of the printing mechanism 110, these functions do not relate directly to the preferred interlace scheme embodied by the present invention and therefore need no further description.

As can be ascertained by reference to the Lipani et al application incorporated by reference above, the determination of the exact charging voltages to be applied to the charging electrode 126 is a multiple step procedure. To provide accurate drop placement, the controller 138 takes into account the charging history on droplets both ahead of and behind the particular droplet whose charge is being computed. It is assumed for the purpose of this disclosure that charge histories calculations and printer calibrations are accomplished using techniques known in the art. In addition to these matters, the controller 138 imposes the present interlace strategy on the droplet charging to further reduce electrostatic and aerodynamic interaction between droplets as discussed below.

Figure 2A:
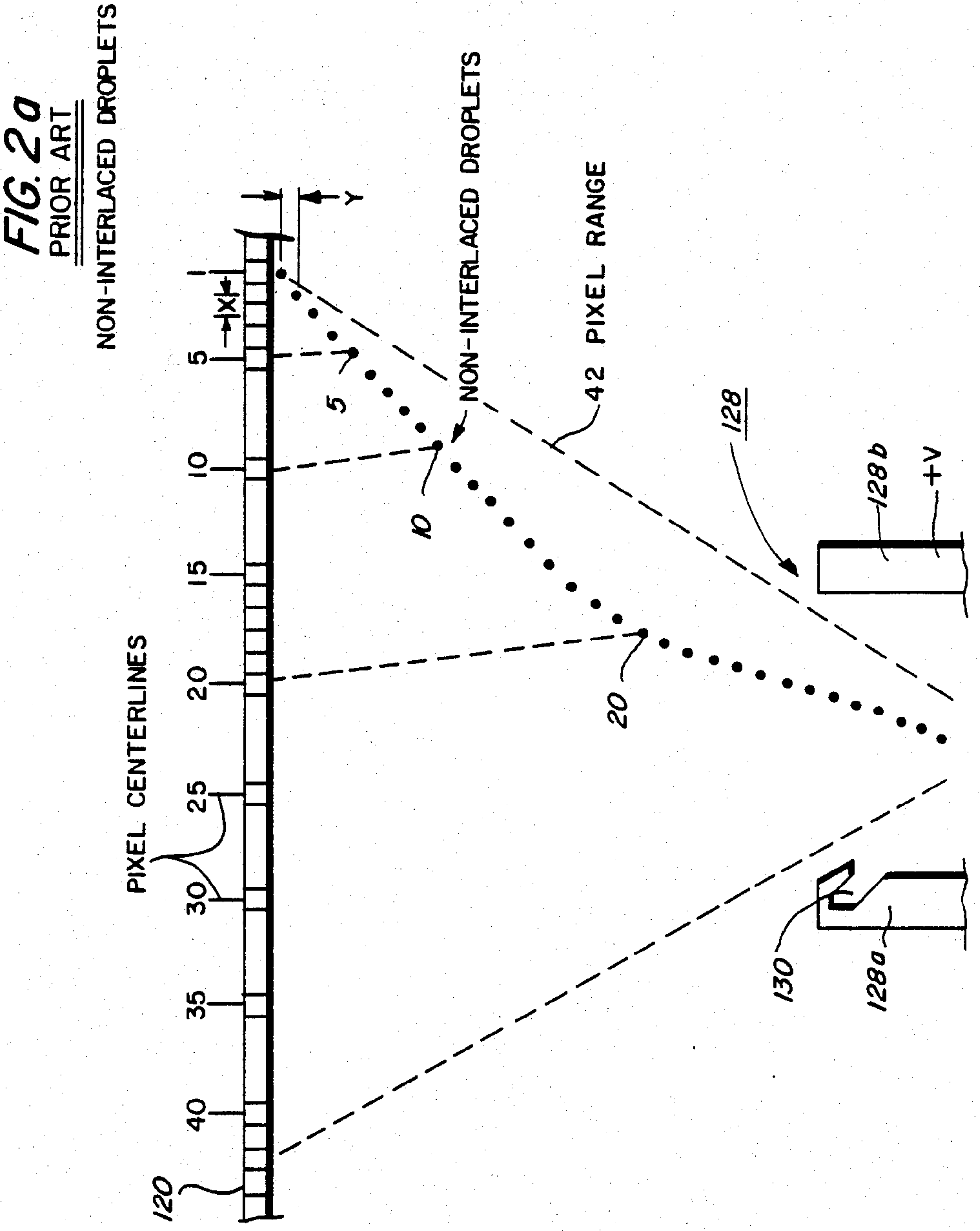
FIG. 2a PRIOR ART
FIG. 2A shows a series of consecutively generated ink droplets in a non-interlace trajectory format.

The interlace scheme will be discussed in conjunction with a bipolar deflection arrangement wherein the charged droplets 124 enter a region of uniform electric field midway between two field generating electrodes **128*a,b* (FIG. 2A). One electrode 128*a* is grounded and the second 128*b* is maintained at a voltage great enough to generate an electric field slightly less than the breakdown electric field for air. Although only one pair of field generating electrodes 128*a,b*** is shown in the figures, it should be appreciated that in a stitched array two electrodes are provided for each ink nozzle and preferably the grounded and high potential electrodes alternate along the array width.

Shown integrally constructed in the grounded electrode **128*a* is the gutter 130 for recirculating ink droplets not directed to the recording medium 120. If the gutter electrode is grounded and the non-grounded electrode 128*b* is positively charged, those droplets directed to the gutter must be positively charged during droplet formation to a level greater than the charge on droplets which are to strike the recording medium 120. For clarity of illustration the drop sensor 132 has been omitted from FIGS. 2A and 2B** and also from the other Figures illustrating the present interlace scheme.

In the disclosed embodiment, each nozzle along the array width can transmit charged droplets to each of 42 equally spaced positions (pixels) along its associated portion of the recording member width. In FIGS. 2A–5, the center of every fifth of these equally spaced droplet or pixel positions has been marked along the print plane of the recording medium 120. As the improved interlace strategy is analyzed, it is assumed a series of 42 droplets are transmitted across the 42 elemental areas or pixel positions to provide a line of ink markings uninterrupted by spaces. It should be understood, however, that typically the series of droplets which are directed to the paper would be spaced with gutter droplets to impose a desired pattern on the medium 120.

Disclosed in FIG. 2A is a non-interlaced sequencing of droplets directed toward the recording member 120. The first droplet of the sequence (labeled droplet 1) strikes the first incremental region or pixel location on the recording medium, the second generated droplet strikes the second incremental area or pixel location, the third strikes the third, etc. Experience with such a non-interlace system of drop generation indicates such a procedure produces substantial aerodynamic and electrostatic interaction between droplets with resultant drop placement errors and drop merge events.

Figure 2B:
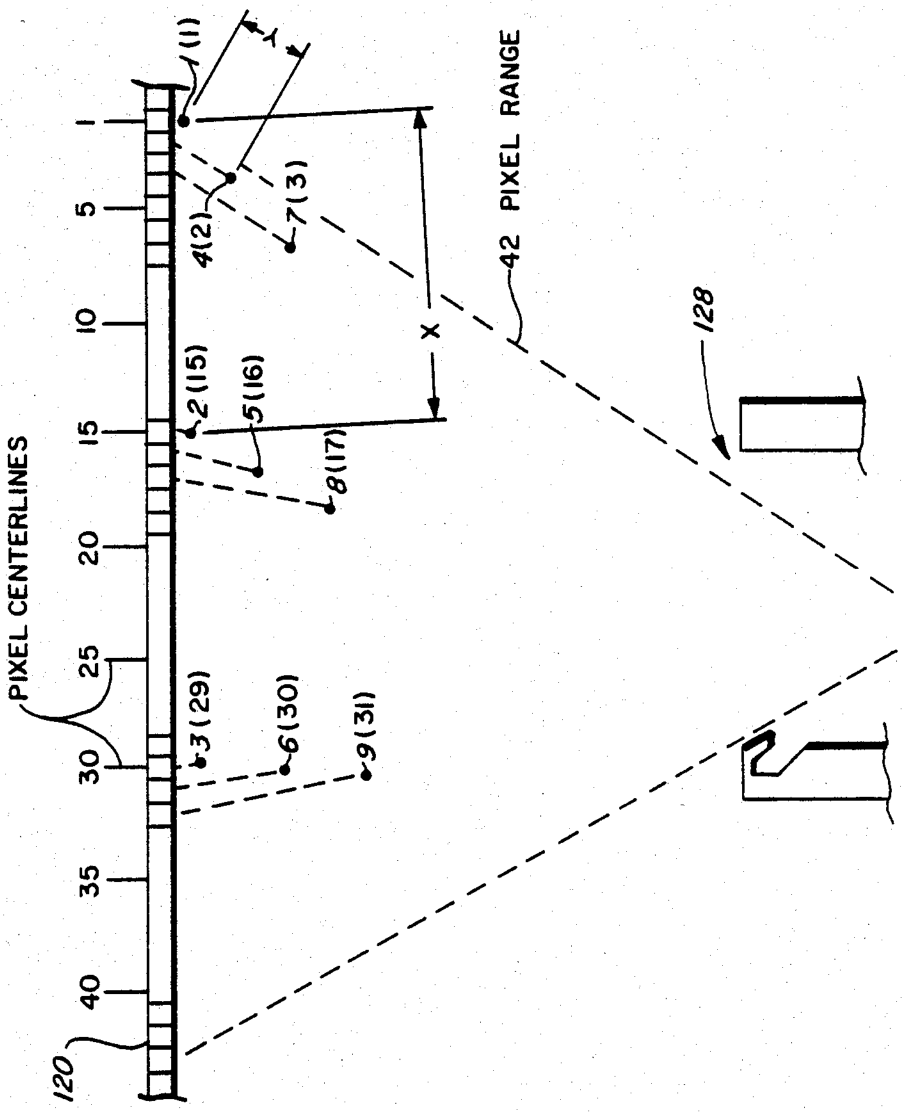
FIG. 2b PRIOR ART
FIG. 2B shows a series of consecutively generated ink droplets in a prior art single level, triple interlace trajectory format.

To lessen the drop-to-drop interactions so called interlace schemes have been proposed. FIG. 2B illustrates a single level triple interlace procedure. As in the non-interlace example of FIG. 2A, the first droplet in the sequence is directed to position or pixel number 1. The second droplet is directed to the fifteenth pixel, the third droplet is directed to the twenty-ninth pixel and then the second pixel location is printed with the fourth drop generated in the sequence. This triple interlace separates droplets both in the axial direction (y) along the path of droplet travel and in the transverse direction (x) of droplet deflection away from the initial trajectory. Thus, for the single level, triple interlace scheme shown in FIG. 2B, the transverse separation (x) reaches a maximum just before the droplets strike the recording medium 120 and at that point the droplets are separated by approximately one third the width of segment of the recording medium covered by the one nozzle (14 pixel widths in the example). The axial separation (y) between droplets directed to adjacent pixels (pixel positions 1 and 2, for example) is approximately three times greater than the non-interlace separation.

Figure 3:
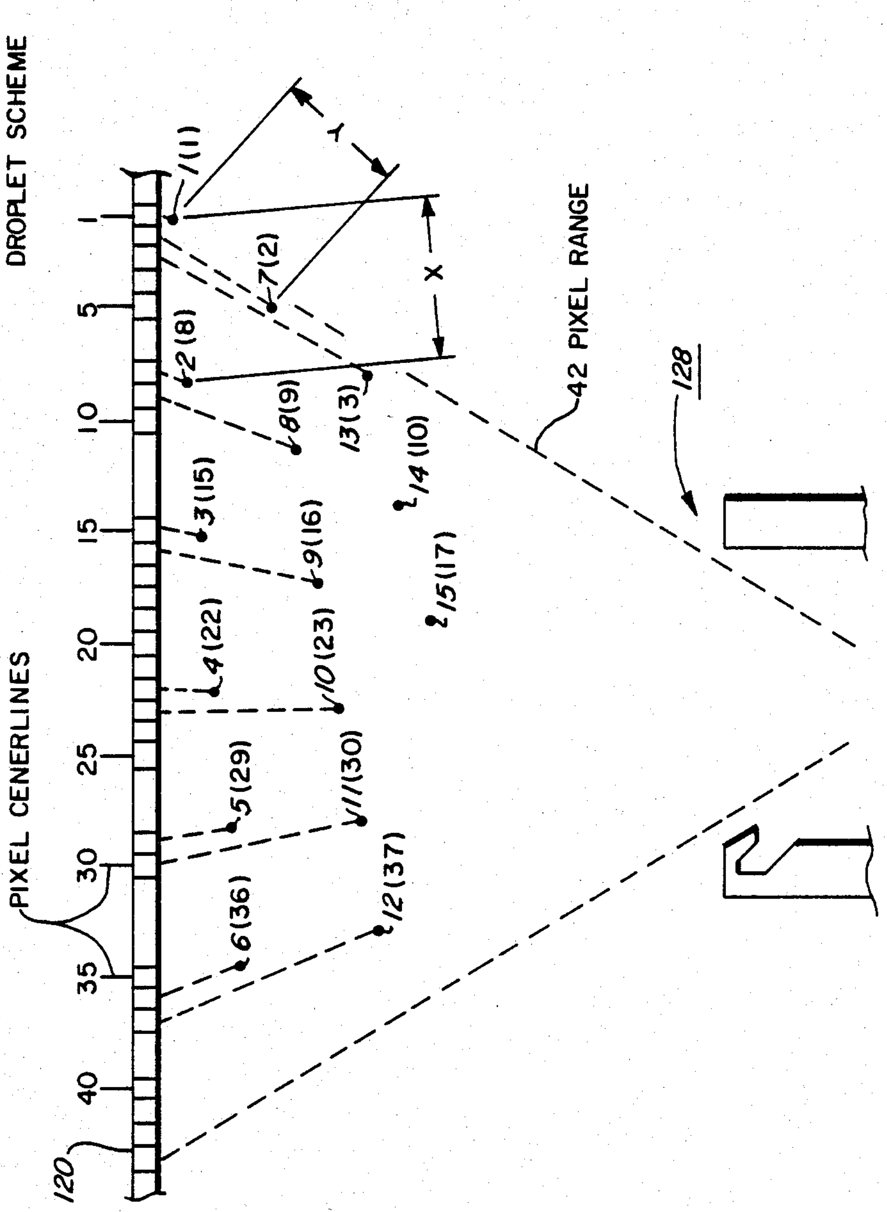
FIG. 3 PRIOR ART
FIG. 3 shows a series of consecutively generated ink droplets in a prior art single level, six interlace trajectory format.

High speed ink jet printers having drop repetition frequencies of 100 to 400 kHz and droplet speeds on the order of 15 to 30 meters/sec tax the axial separation (y) capabilities of a triple interlace scheme. The drop-to-drop spacing between closely adjacent pixels is not enough to adequately reduce aerodynamic interactions. To increase the axial separation (y) between closely placed droplets, higher order interlace schemes have been proposed. FIG. 3 illustrates a six interlace scheme where the axial separation has been increased to six droplet spacings. Pixel positions 1, 8, 15, 22, 29 and 36 are all printed by respective, sequentially generated droplets 1 through 6 prior to pixel position 2 being printed by the seventh sequentially generated droplet 7 so the FIG. 3 axial spacing is about two times the axial spacing of the FIG. 2B triple interlace approach.

The increased axial spacing achieved by higher order interlace strategies results, however, in a diminution of the transverse separation (x) for successively generated droplets. Thus, the 6 order interlace shown in FIG. 3 has doubled the drop-to-drop axial spacing (y) at the exposure of a halving of the side-to-side spacing (x). This halving of the distance between successively generated droplets results in a quadrupling of the coulomb interactions between droplets with a corresponding decrease in droplet placement accuracy. The increased coulomb interaction between droplets overrides the benefit obtained by increasing the axial spacing between droplets and the resulting decrease in aerodynamic interaction.

DESCRIPTION OF THE INVENTION

Figure 4:
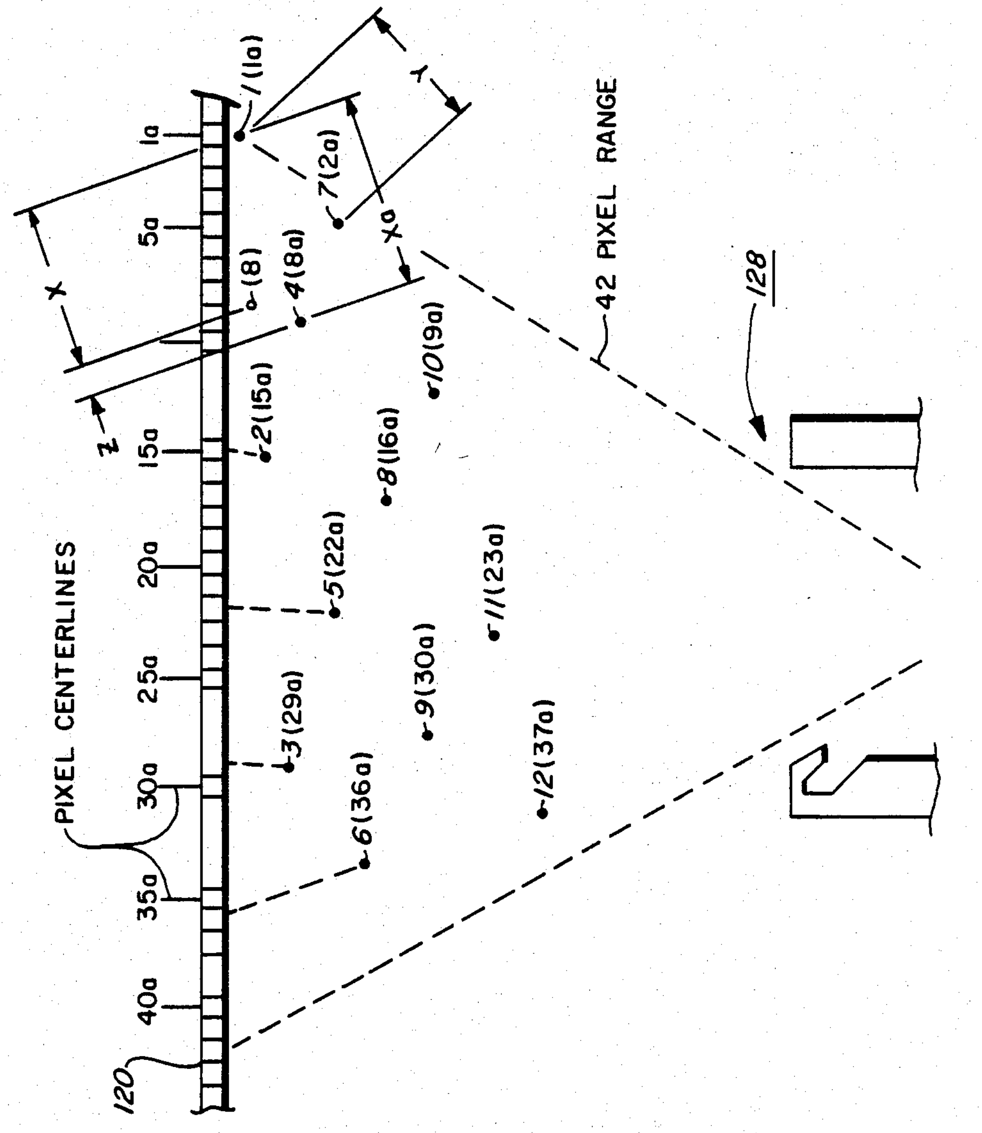
FIGS. 4–6 illustrate the present multiple level droplet, six interlace strategy.
Figure 5:
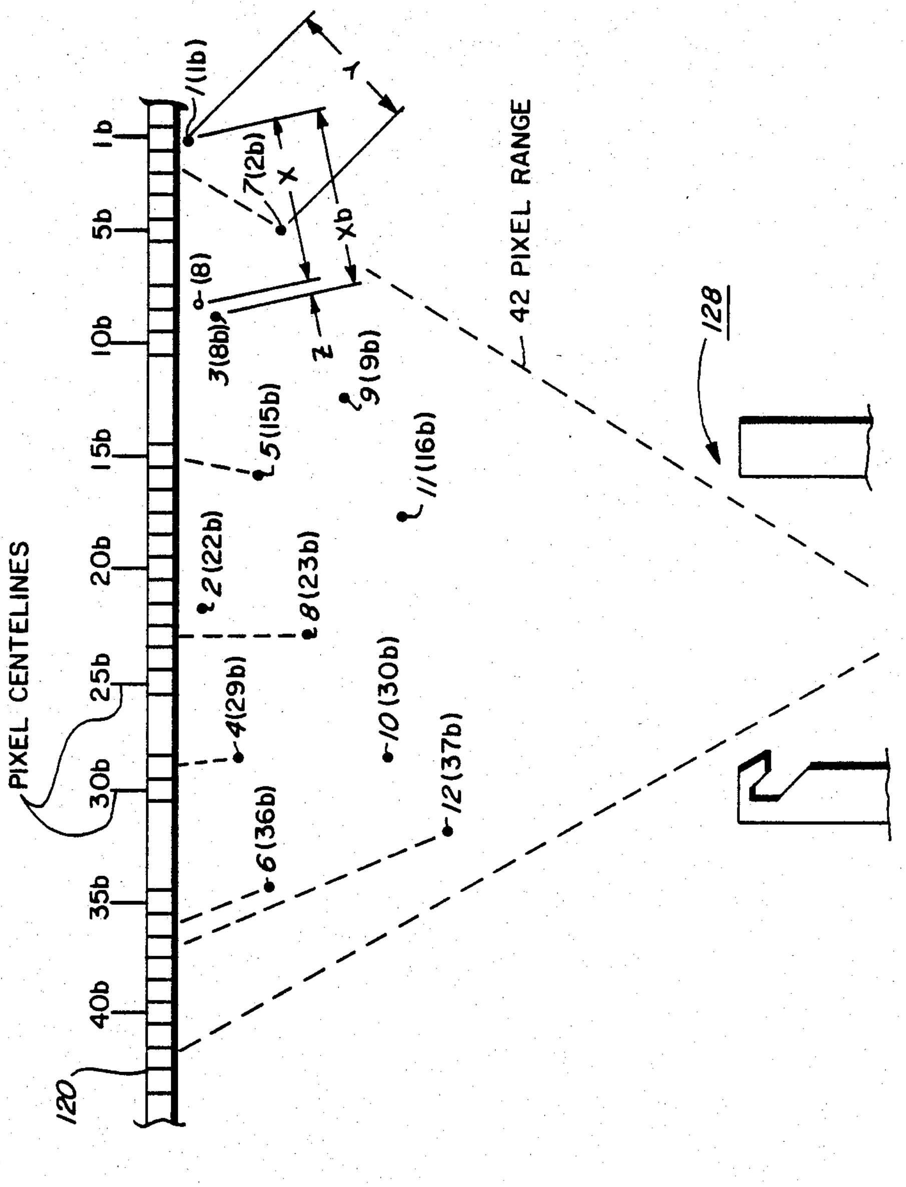

FIGS. 4 and 5 illustrate the improved interlace strategy comprising the present invention. In both figures, a drop-to-drop axial (y) separation between closely adjacent droplets of six droplet wavelengths or widths is achieved with improved transverse (x) separation. As in the above drop interlace sequences, the first droplet in the series goes to the first pixel. The next droplet, however, has a side-to-side displacement from the first greater than the interlace scheme shown in FIG. 3. In FIG. 4, compare the distance (x) between the FIG. 3 ink droplet directed to pixel 8 (shown as a circle) and droplet 1 with the distance (xa) between ink droplet 4 directed to pixel location 8_a_ and droplet 1. The increased separation (z) is achieved by imposing a tiered or multi-level interlace to those droplets produced intermediate closely spaced droplets. In the FIG. 3 interlace format, the five droplets (2 through 6) between the droplets 1 and 7 directed respectively to pixel 1 and pixel 2 scan across the illustrated portion of the recording medium to equally spaced higher numbered pixel locations. According to the present invention, the droplets generated between the closely adjacent drops do not follow the pattern of constantly increasing pixel location. Instead, the rhythm of droplet placement is disrupted so that multiple scans across the record member width are made before droplets are directed to adjacent pixel locations. In FIG. 4, for example, the sequence of pixel locations for successively generated droplets follows the pattern 1, 15, 29, 8, 22, 36, 2, 16, 30, 9, 23, 37, 3 . . . until all 42 pixel locations have been printed. As the sequence begins, the first, fifteen and twenty-nine pixel locations are addressed in the first level of the multilevel interlace by respective, sequentially generated droplets 1, 2 and 3. In FIG. 4, the pixel location for the sequentially generated and numbered droplets are placed in parenthesis by the droplet number. The suffix "a" or "b" is added to the pixel location to distinguish the interlace schemes depicted in FIGS. 4 and 5. On the second level, the eighth, twenty-second, and thirty-sixth pixel locations are printed by respective, sequentially generated droplets 4, 5 and 6. After the thirty-sixth pixel is printed, one droplet has been placed in each of the six equal portions of the segment of the recording medium allotted to that particular nozzle, and the second pixel location in each of the six equal portions of the segment is next to be addressed. This two tier six interlace pattern is then repeated.

An alternative but nearly equivalent benefit is achieved by a three tier or level six wavelengths interlace scheme shown in FIG. 5. The pixel location sequence for this scheme is as follows: 1, 22, 8, 29, 15, 36, 2, 23, 9, 30, 16, 37, 3 . . . etc. Here only two droplets comprise each level of the tri-level, six interlace pattern. It is seen in this interlace scheme that alternate droplets directed to the recording medium 120 receive opposite polarity charges and are directed to opposite sides of the initial drop trajectory by the electric field between the electrodes 128_a,b_.

Figure 6:
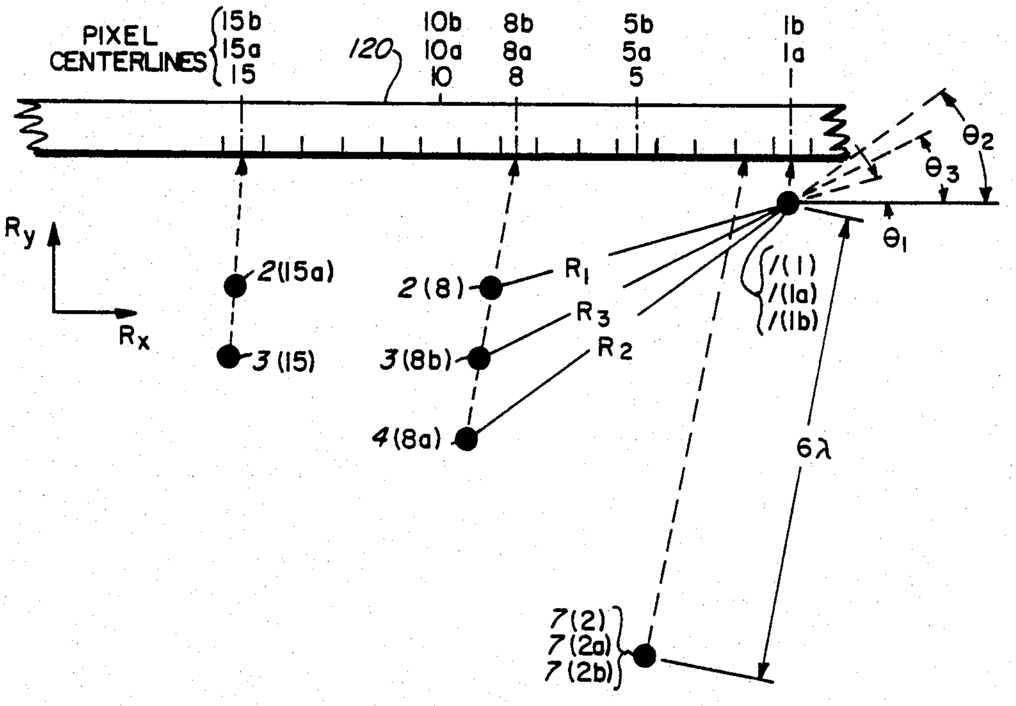

To illustrate more clearly the advantages of the multi-level, six interlace scheme, droplet positions from the interlace schemes illustrated in FIGS. 3, 4 and 5 have been superimposed in FIG. 6 with the scheme in FIG. 3 being prior art and the present invention being depicted in FIGS. 4 and 5. The intended pixel location for each droplet is in parenthesis following its sequential generated number. Pixel locations are further delineated with "a" or "b" designations to distinguish between FIG. 4 and 5 interlace droplets respectively. Thus, the droplet labeled 4(8_a_) is the fourth droplet generated after the one intended for pixel location 1 and is intended for pixel 8_a_ in the FIG. 4 interlace scheme. As pointed out above. the seventh generated droplet in each of the three sequences is thrown to the second pixel location and is separated from the first droplet by about six droplet wavelengths (6λ) or widths.

The side-to-side separation are not uniform for the three interlace procedures shown in FIG. 6. The closest side-to-side separation for the six order interlace pattern is between drops directed to the first and eighth pixels. In the region just prior to the droplets striking the medium 120, the separation between these two droplets has been denoted by a vector R. Vector $R_1$, denotes the separation between the droplets 1(1) and 2(8) of FIG. 3, vector $R_2$ denotes the separation between the droplets 1(1_a_) and 4(8_a_) of FIG. 4 and the vector $R_3$ for those of droplets 1(1_b_) and 3(8_b_) of FIG. 5. the coulomb repulsion is directed along this direction and can be broken into an axial $R_y$ and side-to-side $R_x$ components. The $R_y$ component of these coulomb force has a lesser affect on drop placement accuracy than the $R_x$ component. The $R_x$ component of the coulomb force is the significant factor in determining droplet placement inaccuracy and is given by the relation:

$$R_x = \frac{1}{4\pi\epsilon_D} \frac{q_1 q_8 \cos\theta}{|x^2|}$$

where $\theta$ is the angle between the $R_x$ direction and the vectors $R_1$, $R_2$ or $R_3$ between the droplets and $q_1$ and $q_8$ are the charges on the respective droplets directed to pixels 1 and 8.

In a similar manner the $R_x$ component of the coulomb force between drops directed to pixels 8, 8_a_, 8_b_ and respective droplets directed to pixels 1, 1_a_, 1_b_ can be determined. Since $R_1 < R_3 < R_2$ and $\theta_1 < \theta_3 < \theta_2$, it is apparent that the $R_x$ component of the coulomb interaction between droplet 1 and droplets 4(8_a_) and 3(8_b_) is less than the interaction between droplet 1 and droplet 2(8). This reduced coulomb interaction between ink droplets is achieved without a decrease in the axial separation between droplets thrown to closely adjacent marking positions.

At first blush it would appear that of the two disclosed interlace schemes, the one which separates the first droplet from the next closest droplet by the vector $R_2$ is preferably since $R_2 > R_3$ and $\theta_2 > \theta_2$. It should be recalled, however, that the side-to-side deflection is greater between adjacently generated droplet 1 and droplet 2(22_b_) of FIGS. 5 than between droplet 1 and droplet 2(15_a_) of FIG. 4. Thus, the decrease in interaction between droplet 4 for pixel location 8_a_ and the first droplet is achieved at the expense of an increase in interaction between successively generated droplets, i.e. droplet 1 and droplet 2 for pixel location 15_a_ in FIGS. 4 and 6.

A methodology for charging the droplets to produce a given pattern on the recording member is disclosed in the above referenced Lipani et al patent application. Generally, a digital signal representative of a desired drop charge is converted to an analog signal by the digital to analog converter 142. The digital charge representation q depends upon a number of factors including charging history of other droplets and pixel location for the droplet to be charged. The pixel location for a given droplet is, in turn, a function of the interlace pattern to be imposed on the series of droplets generated by a given printer nozzle. In a preferred interlacing scheme, a series of print/no print signals to the input 150 are stored in a storage buffer within the controller in consecutive pixel order. An interlace look up table in the controller 138 scrambles the pixel locations so that sequentially produced drops are directed to non-sequential pixel locations and in non-sequential portions (i.e. 7 adjacent pixel locations) of the total lineal pixel segment (i.e. 42) allotted to that particular nozzle, while maintaining the print/no print distinction for each pixel. The scrambled (or interlaced) data is then used to derive a unique charging voltage for each droplet according to the format disclosed in the Lipani et al application.

The specific interlace illustrations described have been used to describe the present multi-level six interlace invention and should not limit the scope of the that invention. On the contrary, it is the intent that all alterations or modifications made falling within the spirit or scope of other appended claims be protected by the present application.

I claim:

1. An improved process for controlling the trajectories of ink droplets from a plurality of nozzles of an ink jet printing device of the type having a droplet generator with multiple nozzles for generating streams of droplets, a charging electrode for each nozzle operated by a controller for inducing a charge of either polarity on each droplet as they pass thereby and a means for producing an electric field for deflecting the charged droplets to specific pixel locations on a recording medium according to the induced charge placed thereon by the charging electrodes or to an ink recovering gutter depending upon a print or no print charging decision by the controller, the improved process comprising: charging of said droplets by its associated charging electrode according to a multiple level interlace scheme such that sequentially generated droplets are directed serially to one pixel in each of a predetermined number of groupings of equal pixel locations that make up the total number of linear, adjacent pixel locations which are assigned to each particular nozzle, said interlace scheme assuring that succeeding droplets are directed to predetermined pixels located in groupings always separated by a distance equal to at least two pixel groupings, the multiple level interlace scheme being accomplished by multiple scanning of the total number of pixel groupings for print or no print decisions of said predetermined pixel location in each of said pixel groupings prior to repeating the multiple scanning for subsequent print or no print decisions for a succeeding pixel location in each of said pixel grouping, said multiple scanning of the total number of pixel groupings being continued until each pixel location in each group has been addressed and a droplet produced therefor which will be directed to the recording medium or to the gutter depending upon instructions from the controller, so that droplets directed to contiguous pixels are separated by the distance equivalent to the in-flight spacing between a number of sequentially generated droplets equal to the number of pixel groups and so that adjacent, sequentially generated droplets are separated prior to their impact with the recording medium by a distance equal to at least two pixel groups.

2. The improved process of claim 1 wherein each two consecutively generated droplets directed to said recording medium are oppositely charged.

3. In an ink jet printing process wherein an ink jet generator directs a plurality of ink jet columns toward a record medium, ink from each of said columns being deflectable to scan across a specific one scan portion of multiple adjacent scan portions which make up a page width on said record medium, a process for improving the accuracy of ink placement on said scan portions including the steps of:

causing said columns to break off into droplets in their travel to said medium, charging said droplets according to an interlace charging scheme, and deflecting said charged droplets with an electric field such that each column can throw droplets across the entire width of its associated scan portion, the improvement comprising: the step of charging said droplets so that said electric field separates said droplets both axially along the direction of initial ink droplet motion and transversely to the direction of droplet motion to reduce aerodynamic and electrostatic interactions of said charged droplets according to a multiple level interlace pattern, said multiple interlace being formed by separating droplets from adjacent equal segments of said scan portion width with a plurality of droplets directed to other segments of said scan portion width by interrupting the scan or deflection direction at least once and rescanning before said adjacent segments of the scan portion are printed with ink droplet, so that the droplets do not follow a rhythm wherein one droplet each is placed in each adjacent segment of said scan portion width during a single scan entirely cross said width, said interlace pattern comprising a double level, high order interlace pattern in which the interlace includes a 3 droplet per 2 scan widths droplet rhythm, said 3 droplet per 2 scan widths droplet rhythm providing that said width of said scan portion is divided by the interlace order number to obtain a number of adjacent segments in each scan portion and one droplet being directed to one segment in each non-adjacent segment before a droplet is directed to the remaining segments in order to place one droplet in each segment of the scan portion of the record medium before repeating the pattern to place the second droplet in each segment, whereby adjacently printed droplets in each segment are printed by droplets separated by a series of sequentially generated droplets equal to said number of segments and the distance between a droplet which strikes the record medium and the next closest droplet to strike said record medium is always more than the distance of one segment at the time just prior to striking the record medium by these two droplets.

4. The process of claim 3 wherein the interlace pattern comprises a triple level, high order interlace pattern in which the interlace includes a 2 droplet per 3 scan widths droplet rhythm, said 2 droplets per 3 scan widths droplet rhythm providing that said width of said scan portion is divided by the interlace order number to obtain a number of adjacent segments in each scan portion, this number being six for a six order interlace, one droplet being directed to a first location in one of the segments and a second sequentially generated droplet being directed to a first location in a second segment that is separated from the first segment by two adjacent intervening segments, the third sequentially generated droplet being directed to a first location in a segment adjacent the first segment that received the first droplet and the fourth generated droplet being directed to a first location in a segment separated from the one which received the third droplet by two adjacent, intervening segments and which is adjacent the segment which received said second droplet, the fifth generated droplet bieng directed to the segment between the ones receiving the second and third droplets and the sixth generated droplet being directed to the remaining segment which is adjacent to the segment receiving the fourth droplet, so that one droplet is directd to each segment according to the above pattern before a second droplet is received by any segment, the pattern is then repeated until each segment comprising the total width of said scan portion has received a droplet for each droplet location in each segment or, if a droplet location is to be specifically omitted according to the information to be encoded on the record medium, those droplets not to be printed being directed to a gutter so that the transverse distance between a droplet just prior to striking the record medium and the next closest droplet to strike the record medium are spaced more than one segment apart.

* * * * *